United States Patent [19]

Steuer et al.

[11] Patent Number: 5,469,755
[45] Date of Patent: Nov. 28, 1995

[54] MULTI-SPEED BICYCLE HUB AND AN OPERATING MECHANISM THEREOF

[75] Inventors: Werner Steuer, Schweinfurt, Germany; Eduard Bergles, Österreichisch, Austria

[73] Assignee: Fichtel & Sachs AG, Schweinfurt, Germany

[21] Appl. No.: 63,930

[22] Filed: May 19, 1993

[30] Foreign Application Priority Data

May 21, 1992 [DE] Germany .......................... 42 16 826.0

[51] Int. Cl.⁶ .................................................... F16H 3/02
[52] U.S. Cl. .............................. 74/371; 74/473 R; 74/475
[58] Field of Search ...................... 192/6 A, 96; 475/296, 475/297, 298, 299, 300; 74/473 R, 475, 371, 372

[56] References Cited

U.S. PATENT DOCUMENTS

| | | | |
|---|---|---|---|
| 3,021,728 | 2/1962 | Shimano | 475/298 |
| 3,244,212 | 4/1966 | Barry | 151/69 |
| 4,160,393 | 7/1979 | Fukui | 192/6 A |
| 4,947,703 | 8/1990 | Bergles | 74/501.5 R |
| 4,973,297 | 11/1990 | Bergles | 192/6 A |

FOREIGN PATENT DOCUMENTS

| | | | |
|---|---|---|---|
| 0350791 | 1/1990 | European Pat. Off. . | |
| 673303 | 3/1939 | Germany . | |
| 1092333 | 11/1958 | Germany | 475/297 |
| 1166027 | 3/1964 | Germany . | |
| 2717305 | 11/1977 | Germany . | |
| 3314229 | 10/1984 | Germany . | |
| 3440066 | 5/1986 | Germany . | |
| 3823385 | 1/1990 | Germany . | |
| 4005102 | 9/1991 | Germany . | |
| 424814 | 2/1935 | United Kingdom . | |

*Primary Examiner*—F. Daniel Lopez
*Attorney, Agent, or Firm*—Brumbaugh, Graves, Donohue & Raymond

[57] ABSTRACT

A multi-speed bicycle hub is combined with an operating mechanism. The operating mechanism is fastened to a hub shaft. In the operating mechanism there is provided a linearly movable operating slide. This operating slide is provided with control tracks. The control tracks act on pivot levers. The pivot levers act on a control rod and a surrounding control tube provided within a hub shaft bore. The control rod and the control tube are in connection with a gear box within the hub sleeve. The control rod and the control tube are secured against being lost, when the hub is not yet combined with the operating mechanism.

47 Claims, 5 Drawing Sheets

MULTI-SPEED BICYCLE HUB AND AN OPERATING MECHANISM THEREOF

BACKGROUND OF THE INVENTION

In multi-speed bicycle hubs with a large number of speeds, e. g. more than three speeds, it is sometimes necessary to provide more than one, e. g. two speed control members within a hub shaft bore of the hub shaft for changing the gear unit to the various speeds. If the control members are in pushingly abutting engagement with control slide members of the gear, it is possible to simply insert the control members from one end of the hub shaft bore towards abutting engagement with respective control slide members. In this case there is, however, a risk that the speed change control members are lost before the bicycle hub is combined with an operating mechanism.

For moving the speed change control members to various positions corresponding to individual speeds an operating mechanism may be used which has a number of mover members corresponding to the number of speed change control members. These mover members act onto the speed change control members. The mover members may be moved through one single input member of the operating mechanism. This input member again may be moved by a transmission means such as a Bowden cable from a handling mechanism. The input member may be provided with a number of control tracks corresponding to the number of mover members, i. e. to the number of speed change control members. Thus, the speed change control members may be brought to various positions, a combination of predetermined positions of the speed change control members defining a predetermined speed.

STATEMENT OF THE PRIOR ART

In German patent publication 38 23 385 corresponding to U.S. Pat. No. 4,947,703 a multi-speed bicycle hub is described in combination with an operating mechanism. Two speed change control members are provided within a hub shaft bore. There is, however, no hint that and how the speed change control members could be secured against being lost before combining the hub with the operating mechanism.

Moreover, in said German publication 38 23 383 and said U.S. Pat. No. 4,947,703 the operating mechanism comprises a rotatably mounted input member which acts with respective cam tracks onto two respective pivot levers, the pivot levers acting onto respective speed change control members of the bicycle hub. In this embodiment the operating mechanism has a rather large dimension in a direction parallel to the hub shaft axis.

From German patent 673 303 a bicycle hub is known which has only one single speed change control member within a hub shaft bore. The operating mechanism comprises an operating slide provided with one single cam track acting on said speed change control member.

OBJECT OF THE INVENTION

It is a first object of the present invention to provide a multi-speed bicycle hub with at least two speed change control members accommodated by the hub shaft bore, wherein the speed change control members can easily be inserted into the hub shaft bore, such as to adopt well defined relative positions with respect to control slide members of the gear means and wherein, nevertheless, the speed change control members can easily be secured against being lost before combining the hub with the operating mechanism.

A further object of the present invention is to provide a multi-speed bicycle hub in combination with an operating mechanism, wherein the bicycle hub has at least two speed change control members within the bore of its hub shaft and wherein, nevertheless, the operating mechanism can be made with small dimensions particularly along the axis of the respective hub shaft.

It is a further object of the present invention to provide an operating mechanism in which the movable components thereof can be protected easily against dust and corrosion such that the usable life-time can be increased.

A further object of the present invention is to provide an operating mechanism and a bicycle hub which can both be easily manufactured and assembled at relatively small costs.

SUMMARY OF THE INVENTION

A multi-speed bicycle hub has a hub shaft with a hub shaft axis. A hub sleeve is rotatably mounted on the hub shaft about the hub shaft axis. Gear means are accommodated within the hub sleeve. At least one driving wheel is in driving connection with an input member of the gear means. At least one output member of the gear means is in driving connection with the hub sleeve. The hub shaft has an axially extending hub shaft bore open towards a hub shaft end. The hub shaft bore accommodates at least two speed change control members extending along the hub shaft bore and being in control connection with the gear means. The hub shaft end is provided with fastening means adapted for fastening engagement with counter-fastening means of an operating mechanism. The operating mechanism comprises respective mover units operationally engageable with respective mover side end portions of respective speed change control members, when an operating mechanism is fastened to the hub shaft end.

A first speed change control member pushingly abuts a first control slide member of the gear means more remote from the hub shaft end, and a second speed change control member pushingly abuts a second control slide member of the gear means nearer to the hub shaft end. The first speed change control member transverses passage means provided by the second control slide member. The first speed change control member is provided with non-return means manoeuverable through the passage means in an axial direction of introduction of the first speed change control member from the hub shaft end towards the first control slide member. The first and the second speed change control members are provided with respective locking means preventing withdrawal of the second speed change control member out of the hub shaft bore in an axial direction opposite to the axial direction of introduction. These basic principles of the present invention allow an easy introduction of both speed change control members, and further allow the speed change control members to be easily secured against withdrawal from the hub shaft bore. Nevertheless, the relative position of the speed change control members and the control slide members is precisely defined by simple abutment means which warrant an extreme precision of respective positions.

The first speed change control member can be a rod-like speed change control member, and the second speed change control member can be a tubular speed change control member surrounding said first speed change control member. This is, however, only a preferred embodiment. It is understandable that the speed change control members could also be arranged side by side within the hub shaft bore, e. g. they could be shaped such as to be complementary in cross-sectional area with respect to the cross-sectional area of the hub shaft bore.

The first speed change control member may have a larger axial length than the second speed change control member for facilitating the insertion into the hub shaft bore.

The locking means of the first speed change control member may be provided axially outside of the mover side end portion of the second speed change control member, and the locking means of the second speed change control member may be provided adjacent the mover side end portion thereof. E. g., the locking means of the rod-like first speed change control member may be provided by a locking head axially outside the mover side end portion of the second speed change control member, and the locking means of the tubular second speed change control member may be provided by the mover side end portion thereof.

Alternatively, the locking means of the rod-like first speed change control member may be provided by a thickened portion thereof located inside the tubular second speed change control member, the locking means of the tubular second speed change control member may in such a case be provided by an internally narrowed portion thereof.

The non-return means are preferably provided by an externally threaded portion of the first speed change control member, and the passage means may be provided with corresponding internal thread means. For obtaining a reliable non-return action the externally threaded portion may be of enlarged diameter as compared with an adjacent section of the rod-like, first speed change control member.

For facilitating adaption of the hub to a spoke assembling machine, the mover side end portions of both speed change control members may be located inside the hub shaft bore. In this case the mover units of the operating mechanism should comprise a mover rod and a mover tube surrounding the mover rod for abutment with respective mover side end portions of the rod-like first speed change control member and the tubular second speed change control member inside the hub shaft bore.

The mover rod and the mover tube may be secured with respect to the operating mechanism against being lost.

According to a further aspect of the present invention, an operating mechanism is to be used in combination with a multi-speed bicycle hub. The multi-speed bicycle hub has a hub shaft with a hub shaft axis. A hub sleeve is rotatably mounted on the hub shaft about the hub shaft axis. Gear means are accommodated within the hub sleeve. At least one driving wheel is in driving connection with an input member of the gear means. At least one output member of said gear means is in driving connection with the hub sleeve. The hub shaft has an axially extending hub shaft bore open towards a hub shaft end. The hub shaft bore accommodates at least two speed change control members extending along the hub shaft bore and being in control connection with the gear means. The hub shaft end is provided with fastening means adapted for fastening engagement with counter-fastening means of an operating mechanism.

The operating mechanism comprises an operating slide guided within a housing of the operating mechanism. The operating slide is provided with respective control tracks for acting on respective speed change control members.

The operating slide may be guided in a direction substantially perpendicular with respect to the hub shaft axis.

The operating slide may be connected to a handling mechanism by transmission means. These transmission means may be push-pull transmission means, e. g. Bowden cable means.

The control tracks can act onto the speed change control members through respective pivot levers pivotally mounted with respect to the housing.

The use of such pivot levers allows relative large movements of the speed change control members at relatively small level variations of the respective control tracks. Thus, the dimensions of the gear operating mechanism can be reduced in spite of the increased number of components. The pivot levers may be one-arm pivot levers or two-arm pivot levers. The pivot levers may be pivotally mounted about a pivot axis substantially perpendicular to both the hub shaft axis and linear guiding means of the operating slide. This is desirable for keeping the dimensions of the operating mechanism small.

The control tracks may be integral with the operating slide. This reduces costs, particularly when the operating slide is shaped by injection moulding of a metal or of plastics material.

The operating slide may be arrestable in individual speed positions by elastically acting arresting means. E. g., the arresting means may comprise a detent track on the operating slide and an elastically loaded detent member engageable into idividual detent recesses of the detent track. The detent member may be a detent lever.

The operating mechanism may be substantially encapsulated by a housing. The housing may be substantially tight against entrance of dust and splashed water. Moreover, the housing may be substantially tight against exit of lubricant.

The housing may be composed by housing shells made of synthetic plastics material.

The mounting means for movably mounting movable components of the operating mechanism may be integral with at least one of the housing shells.

The housing shells may be fastened to each other by screw means or rivet means or ultrasonic welding.

If the first and second pivot levers are shaped, respectively, for engagement with a control rod-like first speed change control member and a tubular second speed change control member surrounding said first speed change control member, the first pivot lever may be shaped for entering into a substantially axially extending slot of the tubular second speed change control member.

The detent track may also be an integral part of the operating slide.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereafter with reference to embodiments shown in the accompanying drawings in which.

DETAILED DESCRIPTION OF THE PREFERRED EMBODIMENTS

Figure 10:
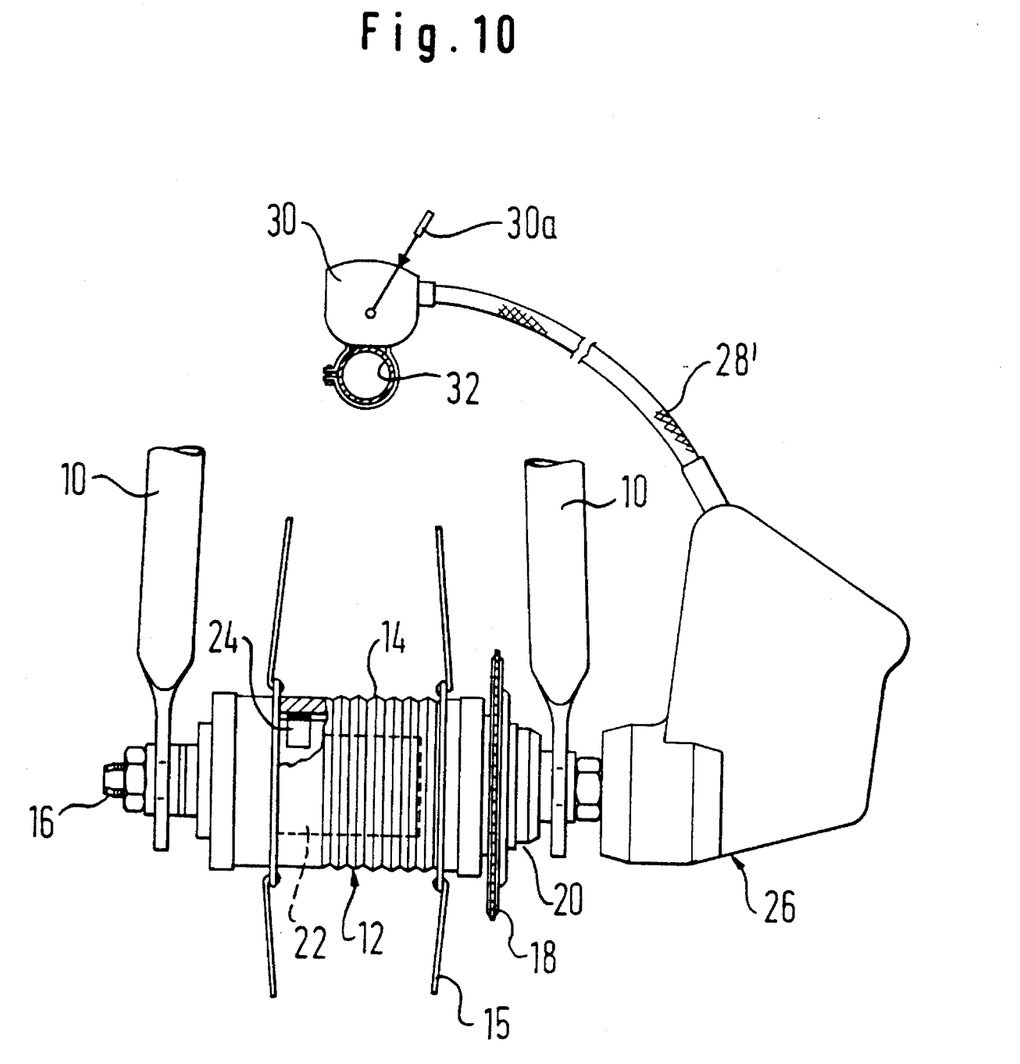

In FIG. 10 there is shown the rear part of a bicycle frame 30, on which a multi-speed bicycle hub is mounted. This hub comprises a hub sleeve 14 mounted on a hub shaft 16. A chain sprocket 18 is rotatably mounted on the hub shaft 16 and is connected with a driver member 20. The driver member 20 is the input member of a gear unit 22 located inside the hub sleeve 14. A free-wheel unit 24 is an output member of the gear unit 22 and drives the hub sleeve 14. An operating mechanism 26 is mounted on the hub shaft 16 and is connected through a Bowden-cable 28' with a handling mechanism 30 fastened to the handlebar 32 of the respective bicycle.

Figure 9:
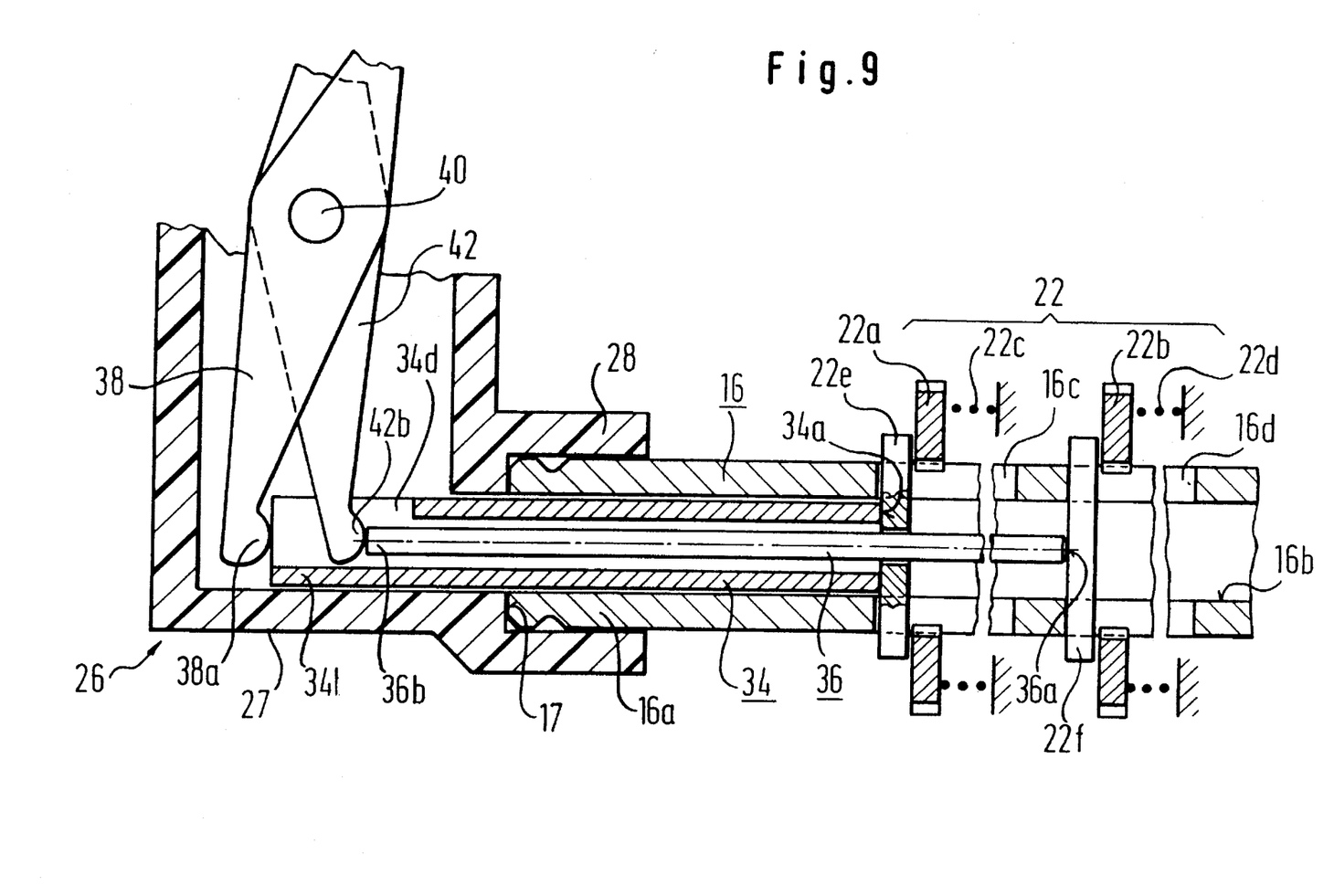
FIG. 9 shows in a diagrammatic view the combination of an operating mechanism with a hub shaft and the abutting engagement between the speed change control members and the control slide members of the gear means and FIG. 10 shows an overall view of a multi-speed bicycle hub partially in section with a rearward fork of a bicycle with an operating mechanism and with a handling mechanism connected to the operating mechanism by a Bowden cable.

In FIG. 9 one can see again the operating mechanism 26 and the hub shaft 16. The operating mechanism 26 comprises a housing 27 which is fastened by a socket portion 28 to an end 16a of the hub shaft 16. The hub shaft 16 is provided with a hub shaft bore 16b. On the hub shaft 16 there is mounted the gear unit 22 which is represented in FIG. 9 as an example by two sun wheels 22a and 22b of a planetary gear system. These sun wheels 22a and 22b are non-rotatably and axially movably mounted on the hub shaft 16 and are biased by helical compression springs 22c and 22d to axial positions as shown in FIG. 9. Slide members 22e and 22f are in pushing engagement with the sun wheels 22a and 22b. These slide members 22e and 22f are axially movable along slots 16c and 16d of the hub shaft. A control tube 34 is in abutting engagement with the slide member 22e and a control rod 36 is in pushing engagement with the slide member 22f. The pushing engagement is in both cases provided by abutment at 34a and 36a respectively. The left hand end 34b of the control tube 34 is in abutting engagement with an engagement nose 38a of a pivot lever 38 of the operating mechanism 26. This pivot lever 38 is pivotally mounted at 40 on the housing 27. The left hand end 36b of the control rod 36 is in abutting engagement with an engagement nose 42b of a pivot lever 42 pivotally mounted at 40. One can further see from FIG. 9 that the engagement nose 42b enters into a slot 34d of the control tube 34 such that axial space requirements are reduced. The engagement nose 38a may be U-shaped or bifurcated such as to engage the end 34b of the control tube 34 at diametrically opposite locations, which are mutually spaced in a direction perpendicular to a plane of FIG. 9.

Figure 1:
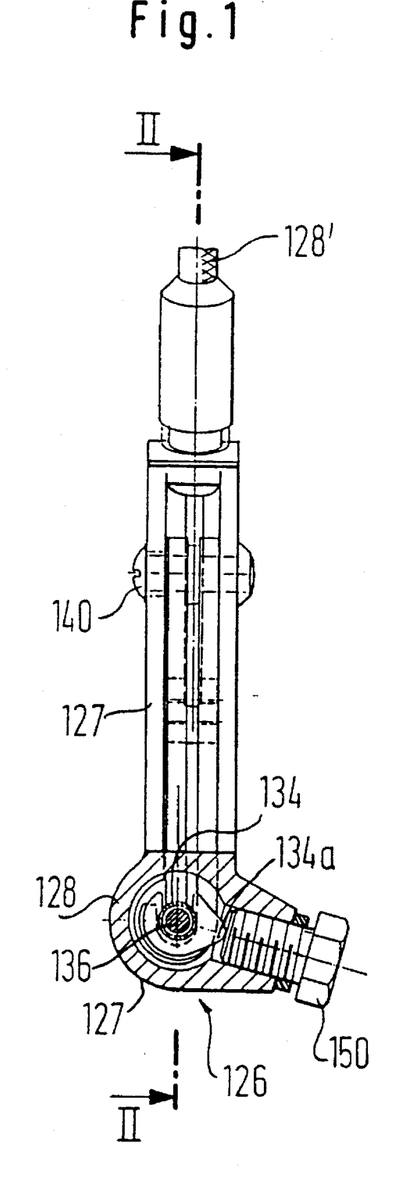
FIG. 1 shows an end view of a first embodiment of an operating mechanism.
Figure 2:
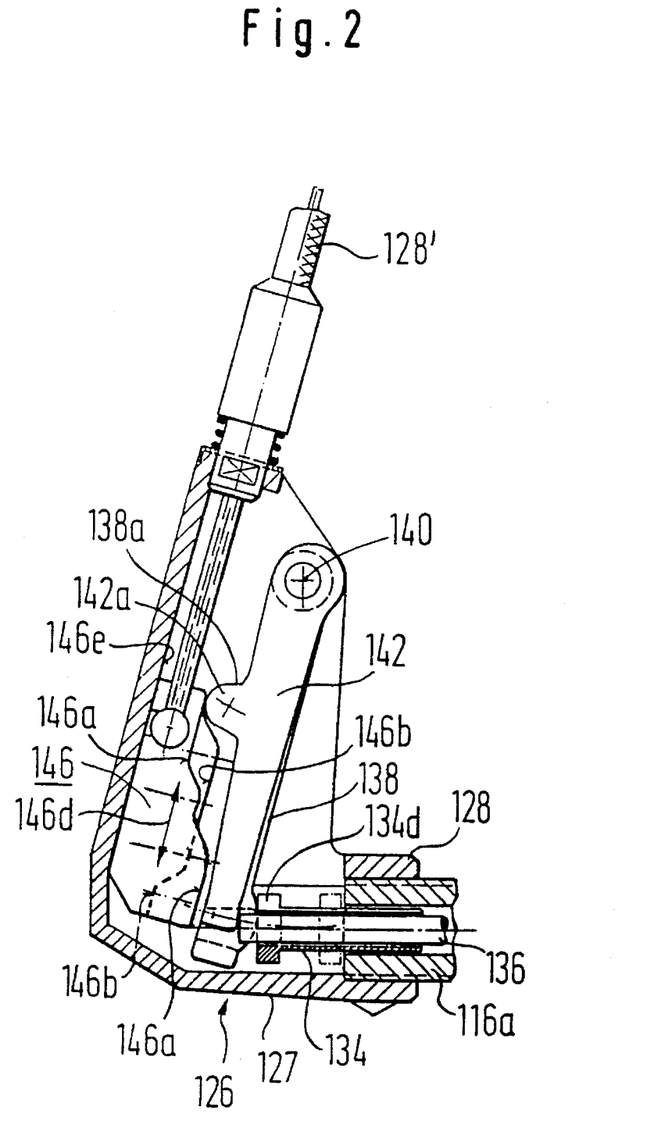
FIG. 2 shows a section according to line II—II of FIG. 1.

Referring now to FIGS. 1 and 2, there is shown a similar embodiment as diagrametically illustrated in FIG. 9, with analogous components being designated by the same reference numbers as in FIG. 9, but increased by 100.

In contradiction to FIG. 9 the pivot levers 138 and 142 are one-arm pivot levers pivotally mounted at 140. For moving the pivot levers 138 and 142 there is provided an operating slide 146. This operating slide is provided with a control track 146a for the pivot lever 142 and with a control track 146b for the pivot lever 138. Both control tracks 146a and 146b are provided with a plurality of plateaus and slopes as shown in FIG. 2. The pivot lever 142 is engaged with the control track 146b by a track follower 142a. The pivot lever 138 is engaged with the control track 146a by a further track follower 138a which is covered in FIG. 2 by the track follower 142a.

By movement of the operating slide 146 in the direction of arrow 146d along a guide face 146e of the housing 127 the pivot levers 138 and 142 are rocked about pivot axis such as to axially move the control tube 134 and the control rod 136 within the hub shaft bore 16b, as shown in more detail in FIG. 9. Thus, the slide members 22e, 22f and the sun wheels 22a, 22b, as shown in FIG. 9, may be axially positioned at various locations by cooperation of the control tube 34 and the spring 22c and also by cooperation of the control rod 36 and the spring 22d.

FIGS. 1 and 2 also show a push-pull Bowden-cable 128' in more detail than in FIG. 10. One can see that the socket 128 can be fastened on the hub shaft end 116a by a clamping screw 250. One can further see from FIGS. 1 and 2 that the control tube 134 is again provided with a slot 134d for allowing the pivot lever 142 to enter therein. For defining the correct angular position of the control tube 134 which permits entrance of pivot lever 142 into the slot 134d, the control tube is secured against rotation by an angular positioning nose 134n engaging into a guiding groove.

Figures 3, 4:
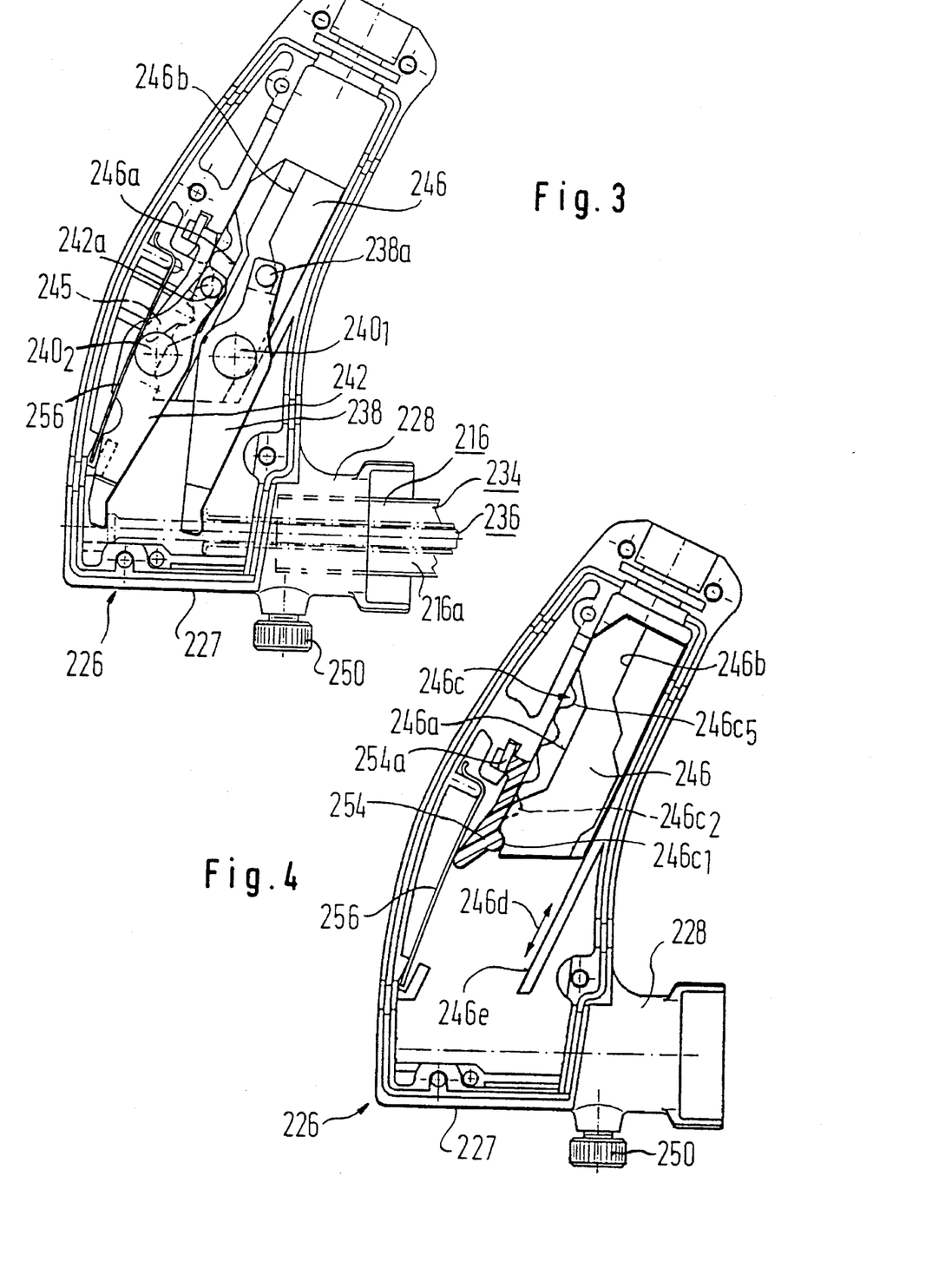
FIG. 3 shows a section analogous to the section of FIG. 2 with a second embodiment of an operating mechanism.
FIG. 4 shows a section according to FIG. 3 with the pivot levers being omitted for reasons of clarity.

In FIGS. 3 and 4 there is shown a further embodiment. In this further embodiment analogous parts are designated by the same reference numbers as in FIGS. 1 and 2, but further increased by 100.

In FIG. 3 one can see that the pivot levers 238 and 242 are pivotally mounted about two pivot axes $240_1$ and $240_2$, respectively. Moreover, both pivot levers 238 and 242 are two-arm pivot levers, so that the control tracks 246a and 246b are directed to the left in FIG. 3 in contradiction to FIG. 2, where the control tracks are directed to the right.

From FIG. 4 one can see that the operating slide 246 is further provided with a detent track 246c which comprises five detent recesses $246c_1$ to $246c_5$. A detent lever 254 of elastomeric material is fastened at 254a to the housing 227, as shown in FIG. 4. This detent lever is spring loaded by a leaf- or wire-spring 256, which is also fastened to the housing 227. As such, the detent lever 254 is biased toward engagement with the detent track 246c and can fall when moving the operating slide 246 in the direction 246d along the guide face 246e into respective detent recesses $246c_1$ to $246c_5$. Accordingly, the operating slide 246 can be easily positioned into discrete longitudinal positions along the guide face 246. Thus, one can also make sure that the control rod 236 and the control tube 234 are located in discrete positions along the hub shaft bore in assuming that the housing 227 is correctly fastened to the hub shaft 216. Thus, erroneous positions of the sun wheel 22a and 22b of FIG. 9 can be avoided. The correct positioning of the housing 227 with respect to the hub shaft 216 can be obtained by axial abutment at 17, as shown in FIG. 9.

In this embodiment of FIGS. 3 and 4 the handling mechanism 30, as shown ill FIG. 10, may be continuously movable without the necessity of detent means. On the other hand the embodiment of FIGS. 1 and 2 is preferably used in combination with a handling mechanism 30, in which the lever 30a can be arrested in discrete angular positions.

It is to be noted that in FIGS. 3 and 4 only a base shell of the housing 227 is shown in which the guide face 246 and the pivot bolts $240_1$ and $240_2$ may be integrally shaped as parts of the base shell. The base shell may be moulded of synthetic plastics material. A corresponding cover shell exists which may be fastened to the base shell by screwing, riveting or ultra-sonic welding. Thus, the housing 227 is secured against entrance of dust and splashed water. Moreover, the cavity defined within the housing 227 may be filled with lubricant which is prevented from exit, so a volume of lubricant may be included, which is sufficient for the expected lifetime of the operating mechanism.

While a push-pull cable 128' as been mentioned in connection with the embodiment of FIGS. 1 and 2, it is easily understandable that a Bowden-wire may also be used with pulling function only when it is combined with spring means biasing the operating slide in a direction against the pulling direction of the Bowden-wire. In the embodiment of FIGS. 3 and 4 a slot in the control tube 234 may be avoided. It is easily understandable that such a slot, as shown at 134d in FIG. 2, may also be provided for avoiding interference of the pivot levers. In such case, it is again helpful, to prevent rotation of the control tube 234, at least in such cases, in which the lever 242 is movable inward and outward of the slot. The control tube may be flattened, as shown, so that it cannot rotate and cause the slot to be misaligned with the lever.

Figure 5:
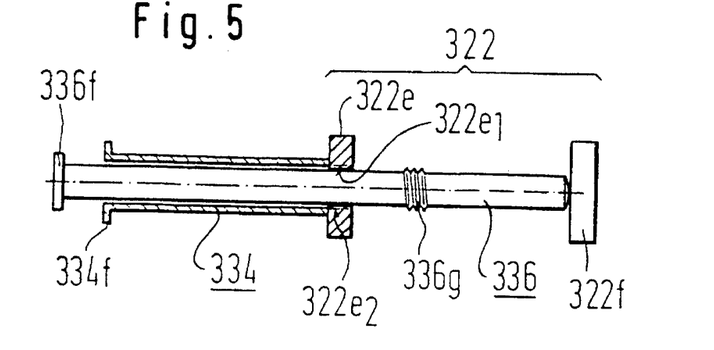
FIG. 5 shows a detail, namely a combination of a first and a second speed change control member with allocated control slide members.

In FIG. 5 there is shown a detail of modifications of parts of the embodiment of FIG. 9 analogous parts being designated by reference numbers increased by 300 compared with FIG. 9.

One can easily see that in the embodiment of FIG. 9 the control rod 36 and the control tube 34 could be easily lost by an unintentional separation from the hub shaft 16. Such loss can be avoided by the embodiment as shown in FIG. 5. In FIG. 5 the control tube 334 has a left hand terminal flange 334f for the engagement with a pivot lever, as shown at 38 in FIG. 9, and the control rod 336 has a left hand terminal flange 336f for the engagement of a pivot lever corresponding to 42 in FIG. 9.

The control rod 336 has an externally threaded section 336g and the slide member 322e has a corresponding internal thread $322e_1$.

The control rod 336 is only in abutting engagement with the slide member 322f.

Before inserting the control rod 336 and the control tube 334 into the hub shaft bore 16b, as shown in FIG. 9, from the left hand end of the hub shaft 16, one can slide the control tube 334 along the control rod 336, starting at the right hand end of the control rod 336, as shown in FIG. 5. This is possible because the external diameter of the externally threaded section 336g is smaller than the internal diameter of the control tube 334. When the control tube 334 is axially positioned with respect to the control rod 336 such as shown in FIG. 5, the group consisting of the control rod 336 and the control tube 334 may be inserted into the hub shaft bore 16b, as shown in FIG. 9. During this insertion movement the externally threaded portion 336g abuts the slide member 322e. It can pass the bore $322e_2$ of the slide member 322e only by screwing the threaded section 336g through the internally threaded bore $322e_2$. As soon as the threaded section 336g has passed the internally threaded bore $322e_2$ the situation corresponds to FIG. 5. Now the control rod 336 can't easily be withdrawn from the bore 16b of FIG. 9 because on withdrawal the externally threaded section 336d abuts against the slide member 322e. Moreover, the control tube 334 can't be withdrawn from the hub shaft bore 16b, as shown in FIG. 9, because the terminal flange 334f abuts the terminal flange 336f. Thus, both, the control rod 336 and the control tube 334 are secured against loss from the hub shaft bore. Nevertheless, the control rod 336 and the control tube 334 are defined in their respective axial positions only by axial abutment with the slide members 322e and 322f without any interference of the externally threaded section 336g and the internally threaded bore $322e_2$. Thus, it is made sure that the slide members 322e and 322f enter into their expected axial positions in response to sliding movement of the operating slide, as shown at 146 in FIG. 2 and at 246 in FIG. 4.

Figures 7, 8:
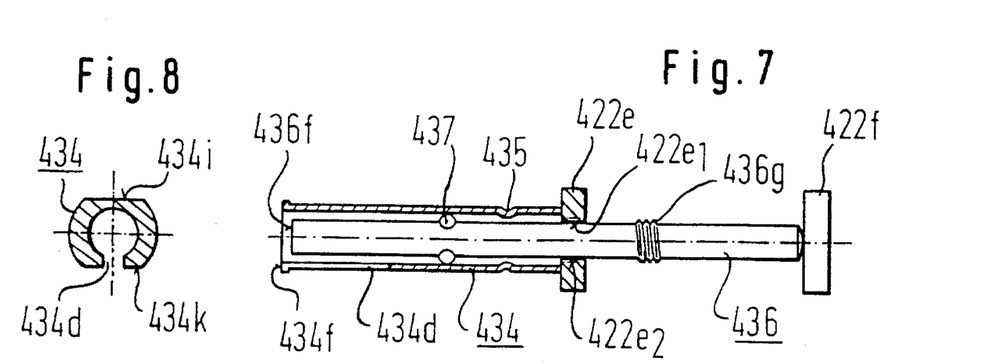
FIG. 7 shows a combination as shown in FIG. 5 with modified locking means between the speed change control members.
FIG. 8 shows a cross-sectional area of a tubular speed change control member.

A further embodiment is shown in FIGS. 7 and 8. Analogous parts are designated by the same reference numbers as in FIG. 5, further increased by 100.

In the embodiment of FIGS. 7 and 8 the assembling method is the same as described with respect to FIG. 5. The locking means preventing the withdrawal of the control tube 434 are, however, different. Rod-side locking means 437 are provided by radial projections 437 and tube-side locking means 435 are provided by a narrowed section 435 of the tube 434.

FIG. 8 shows a slot 434d of the control tube 434. This slot corresponds as to location and function to the slot 34d in FIG. 9 and the slot 134d in FIG. 2. The control tube 434 is provided with flat side faces 434i and 434k for preventing rotation with respect to the hub shaft bore 16, as shown in FIG. 9.

Figure 6:
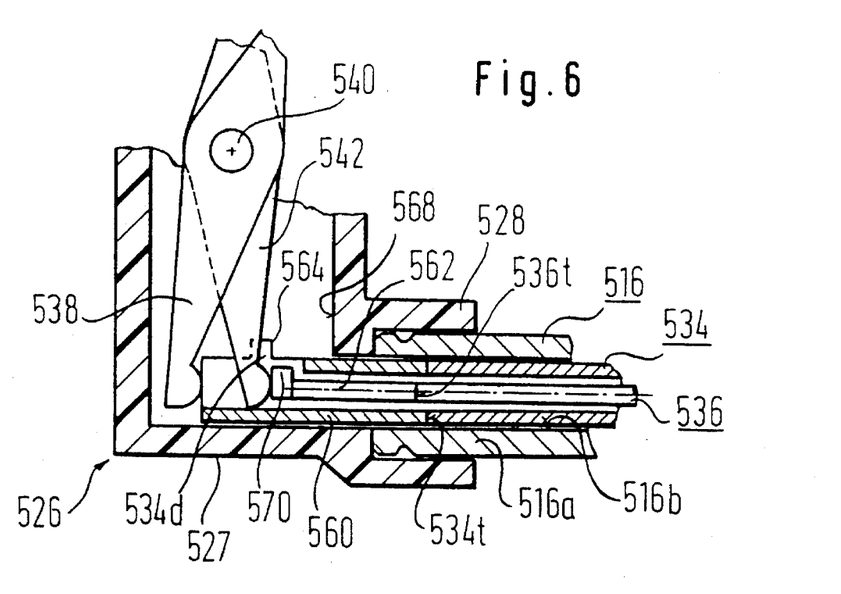
FIG. 6 shows in a diagrammatic way an operating mechanism in combination with a modified embodiment of a bicycle hub.

FIG. 6 shows a modification with respect to FIG. 9. Analogous parts are designated with the same reference numbers as shown in FIG. 9, but increased by 500.

In this embodiment the end faces 536t and 534t of the control rod 536 and the control tube 534, respectively, are located inside the hub shaft bore 516b. Correspondingly, the housing 527 is provided with a mover tube 560 and a mover rod 562 which abut against the control tube 534 and the control rod 536, respectively, at 534t and 536t. The mover tube 560 is secured against loss from the housing 527 by a securing projection 564 engagable with the housing wall at 568. The mover rod is secured against loss by a radial projection 570 engagable with an inner end of the slot 534d. On assembling the operating mechanism 526 with the hub shaft 516 the mover tube 560 engages at 534t the control tube 534 and the mover rod 562 engages at 536t the control tube 534. Such a precise correspondence between the axial positions of the slide members as shown at 22e and 22f in FIG. 9 with respect to the speed order given by the position of the operation slide as shown at 146 in FIG. 2 and at 246 in FIG. 3 is obtained.

The embodiment of FIG. 6 is important: It is to be noted that both ends 536t and 534t are located inside the hub shaft 516. Accordingly, nothing projects axially beyond the hub shaft 516. This is desirable when one wants to insert the hub as shown in FIG. 10 into an automatic spoke assembling machine for attaching the spokes 15 of FIG. 10 to the hub shell 14.

While specific embodiments of the invention have been shown and described in detail to illustrate the application of the inventive principles, it will be understood that the invention may be embodied otherwise without departing from such principles.

What is claimed is:

1. A multi-speed bicycle hub with an operating mechanism, the multi-speed bicycle hub having a hub shaft with a hub shaft axis, a hub sleeve being rotatably mounted on said hub shaft about said hub shaft axis, gear means being accommodated within said hub sleeve, at least one driving wheel being in driving connection with an input member of said gear means, at least one output member of said gear means being in driving connection with said hub sleeve, said hub shaft having an axially extending hub shaft bore open towards a hub shaft end, said hub shaft bore accommodating at least two speed change control members extending along said hub shaft bore and being in control connection with said gear means, said hub shaft end being provided with fastening means adapted for fastening engagement with counter-fastening means of said operating mechanism, said operating Mechanism comprising respective mover units operationally, engageable with respective mover side end portions of respective speed change control members, when said operating mechanism is fastened to said hub shaft end, a first speed change control member engaging a first internal control member of said gear means more remote from said hub shaft end, a second speed change control member engaging a second internal control member of said gear means nearer to said hub shaft and, said first speed change control member passing through passage means across said second internal control member, said first speed change control member being provided with non-return means maneuverable through said passage means in an axial direction of introduction of said first speed change control member from said hub shaft end toward said first internal control member said first and said second speed change control member being provided with respective locking means preventing withdrawal of said second speed change control member out of said hub shaft bore in an axial direction opposite to said axial direction of introduction.

2. A multi-speed bicycle hub as claimed in claim 1, said first speed change control member being a rod-like speed change control member and said second speed change control member being a tubular speed change control member surrounding said first speed change control member.

3. A multi-speed bicycle hub as claimed in claim 2, said locking means of said rod-like first speed change control member being provided by a locking head axially outside said mover side end portion of said second speed change control member, sad locking means of said tubular second speed chance control member being provided by said mover side end portion thereof.

4. A multi-speed bicycle hub as claimed in claim 2, said locking means of said rod-like first speed change control member being provided by a thickened portion thereof located inside said tubular second speed change control member, said locking means of said tubular second speed change control member being provided by an internally narrowed portion thereof.

5. A multi-speed bicycle hub as claimed in claim 2, said non-return means being provided by an externally threaded portion of said first speed change control member, said passage means being provided with corresponding internal thread means.

6. A multi-speed bicycle hub as claimed in claim 5, said externally threaded portion being of enlarged diameter as compared with an adjacent section of said rod-like, first speed change control member.

7. A multi-speed bicycle hub as claimed in claim 2, said mover side end portions of both said speed change control members being located inside said hub shaft bore, said mover units of a said operating mechanism comprising a mover rod and a mover tube surrounding said mover rod for abutment with respective mover side end portions of said rod-like first speed change control member and said tubular second speed change control member inside said hub shaft bore.

8. A multi-speed bicycle hub as claimed in claim 7, said mover rod and said mover tube being secured with respect to said operating mechanism against being lost.

9. A multi-speed bicycle hub as claimed in claim 2, said tubular second speed change control member being provided with a slot adjacent said mover side end portion thereof, said slot receiving a portion of a mover unit acting onto said rod-like first speed change control member.

10. A multi-speed bicycle hub as claimed in claim 9, said portion of said mover unit being part of a pivot lever, said pivot lever being pivotally mounted substantially within a pivot plane containing said hub shaft axis.

11. A multi-speed bicycle hub as claimed in claim 1, said operating mechanism comprising an operating slide guided within a housing of said operating mechanism, said operating slide being provided with respective control tracks for acting on respective speed change control members.

12. A multi-speed bicycle hub as claimed in claim 11, said operating slide being guided in a direction substantially perpendicular with respect to said hub shaft axis.

13. A multi-speed bicycle hub as claimed in claim 11, said operating slide being connected to a handling mechanism by transmission means.

14. A multi-speed bicycle hub as claimed in claim 13, said transmission means being push-pull transmission means.

15. A multi-speed bicycle hub as claimed in claim 11, said control tracks acting onto said speed change control members through respective pivot levers pivotally mounted with respect to said housing.

16. A multi-speed bicycle hub as claimed in claim 15, said pivot levers being pivotally mounted about a pivot axis substantially perpendicular to both said hub shaft axis and linear guiding means of said operating slide.

17. A multi-speed bicycle hub as claimed in claim 11, said control tracks being integral with said operating slide.

18. A multi-speed bicycle hub as claimed in claim 11, said operating slide being arrestable in individual speed positions by elastically acting arresting means.

19. A multi-speed bicycle hub as claimed in claim 18, said arresting means comprising a detent track on said operating slide and an elastically loaded detent member engageable into individual detent recesses of said detent track.

20. A multi-speed bicycle hub as claimed in claim 19, said detent member being a detent lever.

21. A multi-speed bicycle hub as claimed in claim 1, said operating mechanism being substantially encapsulated by a housing.

22. A multi-speed bicycle hub as claimed in claim 21, said housing being substantially tight against entrance of dust and splashed water.

23. A multi-speed bicycle hub as claimed in claim 21, said

11 housing being substantially tight against exit of lubricant.

24. A multi-speed bicycle hub as claimed in claim 21, said housing being composed by housing shells made of synthetic plastics material.

25. A multi-speed bicycle hub as claimed in claim 24, mounting means for movably mounting movable components of said operating mechanism being integral with at least one of said housing shells.

26. A multi-speed bicycle hub as claimed in claim 24, said housing shells being fastened to each other by one of screw means, rivet means and ultrasonic welding seam means.

27. A multi-speed bicycle hub as claimed in claim 1, said first speed change control member having larger axial length than said second speed change control member.

28. A multi-speed bicycle hub as claimed in claim 1, said locking means of said first speed change control member being provided axially outside of said mover side end portion of said second speed change control member and said locking means of said second speed change control member being provided adjacent said mover side end portion thereof.

29. A multi-speed bicycle hub with an operating mechanism, the multi-speed bicycle hub having a hub shaft with a hub shaft axis, a hub sleeve being rotatably mounted on said hub shaft about said hub shaft axis, gear means being accommodated within said hub sleeve, at least one driving wheel being in driving connection with an input member of said gear means 22, at least one output member of said gear means being in driving connection with said hub sleeve, said hub shaft having an axially extending hub shaft bore open towards a hub shaft end, said hub shaft bore accommodating at least two speed change control members extending along said hub shaft bore and being In control connection with said gear means, said hub shaft end being provided with fastening means adapted for fastening engagement with counter-fastening means of said operating mechanism, said operating mechanism comprising an operating slide guided within a housing of said operating mechanism, said operating slide acting through respective control tracks and respective pivot levers engaged by said respective control tracks onto said speed change control members, said pivot levers being elongated in a direction substantially parallel to a guidance direction of said operating slide.

30. A multi-speed bicycle hub as claimed in claim 29, said operating slide being guided in a direction substantially perpendicular with respect to said hub shaft axis.

31. A multi-speed bicycle hub as claimed in claim 29, said operating slide being connected to a handling mechanism by transmission means.

32. A multi-speed bicycle hub as claimed in claim 31, said transmission means being push-pull transmission means.

33. A multi-speed bicycle hub as claimed in claim 29, first and second pivot levers being shaped, respectively, for engagement with a control rod-like first speed change control member and a tubular, second speed change control member surrounding said first speed change control member.

34. A multi-speed bicycle hub as claimed in claim 33, said first pivot lever being shaped for entering into a substantially axially extending slot of said tubular second speed change control member.

35. A multi-speed bicycle hub as claimed in claim 29, control tracks being integral with said operating slide.

36. A multi-speed bicycle hub as claimed in claim 29, said operating slide being arrestable in individual speed positions by elastically acting arresting means.

37. A multi-speed bicycle hub as claimed in claim 36, said arresting means comprising a detent track on said operating slide and an elastically loaded detent member engageable into individual detent recesses of said detent track.

38. A multi-speed bicycle hub as claimed in claim 37, said detent member being a detent lever.

39. A multi-speed bicycle hub as claimed in claim 29, said operating mechanism being substantially, encapsulated by a housing.

40. A multi-speed bicycle hub as claimed in claim 39, said housing being substantially tight against entrance of dust and splashed water.

41. A multi-speed bicycle hub as claimed in claim 39, said housing being substantially tight against exit of lubricant.

42. A multi-speed bicycle hub as claimed in claim 39, said housing being composed by housing shells made of synthetic plastics material.

43. A multi-speed bicycle hub as claimed in claim 42, mounting means for movably mounting movable components of said operating mechanism being integral with at least one of said housing shells.

44. A multi-speed bicycle hub as claimed in claim 42, said housing shells being fastened to each other by one of screw means, rivet means and ultrasonic welding seam means.

45. A multi-speed bicycle hub as claimed in claim 29, said pivot levers being pivotally mounted about a pivot axis substantially perpendicular to both said hub shaft axis and linear guiding means of said operating slide.

46. A multi-speed bicycle hub with an operating mechanism, the multi-speed bicycle hub having a hub shaft with a hub shaft axis, a hub sleeve being rotatably mounted on said hub shaft about said hub shaft axis, gear means being accommodated within said hub sleeve, at least one driving wheel being in driving connection with an input member of said gear means, at least one output member of said gear means being in driving connection with said hub sleeve, said hub shaft having an axially extending hub shaft bore open towards a hub shaft end, said hub shaft bore accommodating at least two speed change control members extending along said hub shaft bore and being in control connection with said gear means, said operating mechanism being located adjacent said hub shaft end and having respective mover units operationally engageable with respective mover-side end portions of respective speed change control members, a first one of said speed change control members being a rod-like speed change control member and a second one of said speed change control members being a tubular speed change control member surrounding said first speed change control member, said second tubular speed change control member being provided with a substantially axial slot adjacent said operating mechanism, a mover unit allocated to said first rod-like speed change control member entering into said second tubular speed change control member through said substantially axial slot for cooperation with a mechanism-side end portion of said first rod-like speed change control member.

47. A multi-speed bicycle hub with an operating mechanism, the multi-speed bicycle hub having a hub shaft with a hub shaft axis, a hub sleeve being rotatably mounted on said hub shaft about said hub shaft axis, gear means being accommodated within said hub sleeve, at least one driving wheel being in driving connection with an input member of said gear means, at least one output member of said gear means being in driving connection with said hub sleeve, said hub shaft having an axially extending hub shaft bore open towards a hub shaft end, said hub shaft bore accommodating at least two speed change control members extending along said hub shaft bore and being In control connection with said gear means, said hub shaft end being provided with fastening means adapted for fastening engagement with counter-fastening means of said operating mechanism,     said operating mechanism comprising an operating slide guided within a housing of said operating mechanism, said operating slide being provided with respective control tracks for acting on respective speed change control members, said control tracks acting onto said speed change control members through respective pivot levers pivotally mounted with respect to said housing.

* * * * *

UNITED STATES PATENT AND TRADEMARK OFFICE
CERTIFICATE OF CORRECTION

PATENT NO. : 5,469,755
DATED : November 28, 1995
INVENTOR(S) : Werner Steuer and Eduard Bergles It is certified that error appears in the above-identified patent and that said Letters Patent is hereby corrected as shown below:

On the title page: Item 75, 2nd line, "Osterreichisch" should read --Graz--
Col. 6, line 25, "axis" should read --axis 140--;
Col. 7, line 25, "as been" should read --has been--;
Col. 9, line 25, "Mechanism" should read --mechanism--;
Col. 9, line 26, "operationally," should read --operationally--;
Col. 9, line 34, "and," should read --, and--;
Col. 9, line 56, "sad" should read --said--;
Col. 10, line 11, "a said" should read --said--;
Col. 11, line 33, "being In" should read --being in--;
Col. 12, line 8, "substantially," should read --substantially--.

Signed and Sealed this

Eighteenth Day of June, 1996

BRUCE LEHMAN

Attest:

Attesting Officer

Commissioner of Patents and Trademarks